(12) United States Patent
Bienvenu et al.

(10) Patent No.: US 10,710,749 B2
(45) Date of Patent: Jul. 14, 2020

(54) DEVICE AND METHOD FOR PARTS ASSEMBLY FOR A NACELLE OF AN AIRCRAFT TURBOJET ENGINE

(71) Applicant: Safran Nacelles, Gonfreville l'Orcher (FR)

(72) Inventors: Philippe Bienvenu, Gonfreville l'Orcher (FR); Christophe Cornu, Gonfreville l'Orcher (FR); Boualem Merabet, Gonfreville l'Orcher (FR); David Delamotte, Gonfreville l'Orcher (FR); Serge Beliny, Gonfreville l'Orcher (FR)

(73) Assignee: Safran Nacelles, Gonfreville l'Orcher (FR)

( * ) Notice: Subject to any disclaimer, the term of this patent is extended or adjusted under 35 U.S.C. 154(b) by 112 days.

(21) Appl. No.: 16/022,910

(22) Filed: Jun. 29, 2018

(65) Prior Publication Data

US 2019/0002131 A1 Jan. 3, 2019

(30) Foreign Application Priority Data

Jun. 29, 2017 (FR) ..................... 17 56013

(51) Int. Cl.

| | |
|---|---|
| *B64F 5/10* | (2017.01) |
| *B23K 20/02* | (2006.01) |
| *B64D 29/02* | (2006.01) |
| *B23K 37/04* | (2006.01) |
| *B23K 1/008* | (2006.01) |
| *B23K 1/00* | (2006.01) |

(Continued)

(52) U.S. Cl.
CPC ............... *B64F 5/10* (2017.01); *B23K 1/008* (2013.01); *B23K 1/0014* (2013.01); *B23K 3/087* (2013.01); *B23K 20/02* (2013.01); *B23K 20/023* (2013.01); *B23K 37/0426* (2013.01); *B29C 33/02* (2013.01); *B29C 43/00* (2013.01); *B64D 29/02* (2013.01); *B23K 2101/001* (2018.08); *B23K 2101/02* (2018.08)

(58) Field of Classification Search
CPC ...... B23K 1/0014; B23K 1/008; B23K 1/012; B23K 3/012
See application file for complete search history.

(56) References Cited

U.S. PATENT DOCUMENTS 2,816,355 A * 12/1957 Herman ............... B23K 1/0014
228/157
2,944,504 A * 7/1960 Herman ............... B23K 1/0014
269/131

(Continued)

FOREIGN PATENT DOCUMENTS

FR 2994115 2/2014

*Primary Examiner* — Jason L Vaughan
(74) *Attorney, Agent, or Firm* — Burris Law, PLLC

(57) ABSTRACT

A device and a method of assembly by brazing or diffusion-welding under a gaseous pressure is provided to make structures for a nacelle of an aircraft turbojet engine such as an inner fixed structure. Sealing of the assembly space inside which the parts to assemble are disposed is provided by tie members exerting a mechanical pressure on mold elements. The tie members include jaws made of a first material and a holding element made of a second material. The first material has a thermal expansion coefficient higher than that of the second material.

9 Claims, 3 Drawing Sheets

(51) Int. Cl.
  *B29C 43/00*  (2006.01)
  *B23K 3/08*  (2006.01)
  *B29C 33/02*  (2006.01)
  *B23K 101/00*  (2006.01)
  *B23K 101/02*  (2006.01)

(56) References Cited

U.S. PATENT DOCUMENTS

| | | | | |
|---|---|---|---|---|
| 2,978,806 A * | 4/1961 | Herbert, Jr. | ............ | B21D 47/00 228/181 |
| 2,979,005 A * | 4/1961 | Herbert, Jr. | .......... | B23K 1/0014 269/131 |
| 3,073,268 A * | 1/1963 | Cole | ................... | B23K 1/0014 228/42 |
| 3,091,684 A * | 5/1963 | Cochran | .............. | B23K 1/0014 219/85.17 |
| 3,136,038 A * | 6/1964 | Huggins | ................... | F28F 1/34 29/890.046 |
| 3,473,210 A * | 10/1969 | Klank | ................... | B21D 53/04 29/890.039 |
| 3,612,387 A * | 10/1971 | Rathbun | .............. | B23K 1/0014 228/6.1 |
| 3,726,466 A * | 4/1973 | Vedder | ................ | B23K 1/0012 228/44.3 |
| 3,737,978 A * | 6/1973 | Rathbun | ............... | B23K 1/0014 228/190 |
| 3,768,985 A * | 10/1973 | Woodward | ........... | B23K 35/005 428/593 |
| 3,941,293 A * | 3/1976 | Chartet | ................ | B23K 1/0012 228/44.3 |
| 4,480,165 A * | 10/1984 | Haushalter | ........... | B23K 1/0012 219/158 |
| 5,004,045 A * | 4/1991 | Le Gauyer | ........... | B23K 1/0012 165/149 |
| 6,003,754 A * | 12/1999 | Rhodes | ..................... | B22C 7/00 228/106 |
| 8,225,983 B2 * | 7/2012 | Takahashi | ........... | B23K 1/0014 228/44.3 |
| 8,335,292 B2 * | 12/2012 | Koepke | ............. | B23K 37/0435 376/277 |
| 8,701,258 B2 * | 4/2014 | Koepke | ............. | B23K 37/0435 29/402.14 |
| 9,486,870 B2 * | 11/2016 | Bienvenu | ............. | B23K 3/087 |
| 2008/0107227 A1 * | 5/2008 | Koepke | ................. | G21C 15/25 376/302 |
| 2009/0230176 A1 * | 9/2009 | Takahashi | ........... | B23K 1/0014 228/256 |
| 2013/0061441 A1 * | 3/2013 | Koepke | ................ | G21C 17/017 29/402.14 |
| 2014/0299654 A1 * | 10/2014 | Malot | .................... | B23K 31/02 228/173.1 |

\* cited by examiner

DEVICE AND METHOD FOR PARTS ASSEMBLY FOR A NACELLE OF AN AIRCRAFT TURBOJET ENGINE

CROSS-REFERENCE TO RELATED APPLICATIONS

This application claims priority to and the benefit of FR 17/56013 filed on Jun. 29, 2017. The disclosure of the above application is incorporated herein by reference.

FIELD

The present disclosure relates to the field of assembly of parts for a nacelle of an aircraft turbojet engine. More specifically, the present disclosure concerns a device and a method for assembling metallic parts by brazing or diffusion-welding. In a non-limiting manner, the device and the method according to the present disclosure allow making an acoustic panel forming an inner fixed structure of a nacelle of an aircraft turbojet engine.

BACKGROUND

The statements in this section merely provide background information related to the present disclosure and may not constitute prior art.

An acoustic panel forming an inner fixed structure typically comprises a honeycomb-type cellular structure clasped between two skins. These different parts to assemble, that is to say the two skins and the cellular structure, are generally made of a titanium-type metal.

In the aforementioned field, it is known to assemble such parts by brazing or by diffusion-soldering. Brazing consists in heating a filler metal, which may be in the form of a brazing sheet, up to its melting temperature. Typically, brazing sheets are placed between each skin and the cellular structure of the panel. The filler metal is chosen so that its melting temperature is lower than the melting temperature of the parts to assemble. On the contrary of brazing, diffusion-welding consists in melting the parts to assemble without any addition of metal.

A technique of assembly by brazing consists in placing the parts into an assembly space and creating a gaseous pressure inside this space. Creating a gaseous pressure inside the enclosure allows pressing and holding the parts in an arrangement in which they are then brazed. Nonetheless, such a technique requires the assembly space to be sealed.

The patent FR 2 994 115 B1 describes a technique of assembly under gaseous pressure in which sealing of the assembly space is achieved by soldering a cap on a part to assemble. Once the assembly is completed, this technique nonetheless implies unsoldering the cap off the part, which increases the costs related to the assembly.

SUMMARY

The present disclosure provides a satisfactory sealing in the context of an assembly of metallic parts by brazing or diffusion-welding under gaseous pressure, while overcoming the drawbacks of the techniques of the related art.

To this end, the present disclosure relates to a device for assembling by brazing or diffusion-welding metallic parts for a nacelle of an aircraft turbojet engine. This device comprises a tooling including a first mold element and a second mold element. The tooling is arranged to clasp the metallic parts to assemble within an assembly space delimited by the first mold element and the second mold element. The device further comprises a gas injection device arranged to inject a gas into the assembly space so as to increase the pressure therein in order press the metallic parts against each other. The device also comprises an enclosure arranged to receive the tooling and the metallic parts, as well as a heating device arranged to increase the temperature inside the enclosure up to an assembly temperature allowing assembling the metallic parts by brazing or diffusion-welding.

Typically, the assembly temperature is higher than 800° C. and may be comprised:

For parts to assemble made of titanium: between 830° C. and 980° C., for example 850° C.;

For parts to assemble made of stainless steel: between 1000° C. and 1050° C., for example 1010° C.;

For parts to assemble made of aluminum: between 580° C. and 620° C., for example 600° C.

The device according to the present disclosure is characterized in that the tooling further includes tie members to provide the sealing of the assembly space. Each tie member comprises two jaws and a holding element. The holding element is arranged to hold the two jaws in a sealing position in which the jaws exert a mechanical pressure against respective bearing surfaces of the first mold element and of the second mold element. This mechanical pressure inhibits the first mold element and the second mold element from getting away from each other at least along a direction normal to said bearing surfaces at least at the assembly temperature.

The device according to the present disclosure is further characterized in that the jaws of the tie members comprise a first material, in that the holding element of the tie members comprises a second material, and in that the first material has a thermal expansion coefficient higher than that of the second material.

In one form, the first mold element and the second mold element comprise a third material, the third material having a thermal expansion coefficient higher than that of the second material.

In another form, the tie members may be disposed along a circumference of the first mold element and of the second mold element so that the respective mechanical pressure exerted by the jaws of the tie members is uniform along said circumference.

Such a device provides a satisfactory sealing of the assembly space, including when the shape of the parts to assemble is complex and/or has a geometry variable in the three space directions.

Such a device allows overcoming numerous drawbacks of the techniques of the related art, and provides in particular the following advantages:

With regards to the technique described in Patent FR 2 994 115 B1, soldering and then unsoldering a tooling or enclosure element with a part to assemble is not involved in the present disclosure;

With regards to the techniques in which the mechanical pressure to achieve sealing is obtained by actuation of a linear cylinder, the present disclosure provides a uniform mechanical pressure along the entire periphery of the assembly space, in particular when the parts to assemble are intended to form an inner fixed structure or more generally a structure with a complex shape;

The device according to the present disclosure allows in particular assembling an "omega" shaped integral structure forming half of an inner fixed structure comprising both a half-barrel and two half-islets, while suppressing the drawbacks related to the linkages that would be involved to link the half-barrel and the half-islets in the context of a non-integral assembly;

The total weight of the tooling may be reduced thereby limiting the thermal inertia of the tooling and consequently reducing the thermal cycle; and The parts to assemble may be disposed horizontally within the tooling, which facilitates their setup before brazing or diffusion-welding and avoids their collapse during cooling.

In another form, the third material may have a thermal expansion coefficient close or identical to that of the metallic parts to assemble. Such a feature allows avoiding the deformations of said metallic parts during cooling.

In one form, for each tie member, each of the jaws may comprise a contact element and a stop element. In one variation, the contact element may be arranged to come into contact with a bearing surface of the first mold element or of the second mold element in a contact position. In another variation, the stop element may be arranged to be received by the holding element and to hold the contact element in the contact position.

In a variant of this last form, for each tie member, at least one of the jaws may comprise an adjustment part between the contact element and the stop element of the at least one jaw.

Such an adjustment part allows using tie members for different dimensions, in particular thicknesses, of parts to assemble.

In another form, the device may further comprise a pumping device arranged to create vacuum inside the enclosure.

The creation of vacuum inside the enclosure allows avoiding the oxidation of the parts to assemble and, in the case of assembly by brazing, improves the spread-out of the braze and the mechanical properties of the acoustic panel.

In one form, one among the first mold element and the second mold element comprises a protrusion along a circumference of this mold element, this protrusion extending along the direction normal to the bearing surfaces of the first mold element and of the second mold element, the other mold element comprises a cavity along a circumference of this mold element, the first mold element and the second mold element being arranged so that, in the sealing position, said cavity houses said protrusion.

In this manner, sealing is enhanced.

The present disclosure also concerns a method for assembling by brazing or diffusion-welding metallic parts for a nacelle of an aircraft turbojet engine implementing such a device.

According to the present disclosure, the method comprises, and in one form in this order:

an arrangement of the metallic parts to assemble against the first mold element;

an arrangement of the second mold element against the first mold element so as to clasp the metallic parts within the assembly space;

an arrangement of the tie members so as to place the respective jaws of the tie members in the sealing position;

an increase of the temperature of the enclosure, using the heating device, up to the assembly temperature so as to assemble the metallic parts by brazing or diffusion-welding; and an injection of gas into the assembly space using the gas injection device so as to press the metallic parts against each other.

Finally, the present disclosure also covers the use of such a device to assemble metallic parts so as to make an integral structure for a nacelle of an aircraft turbojet engine. In particular, this integral structure may form a half-barrel of an inner fixed structure and two half-islets intended to link this integral structure to an outer fixed structure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
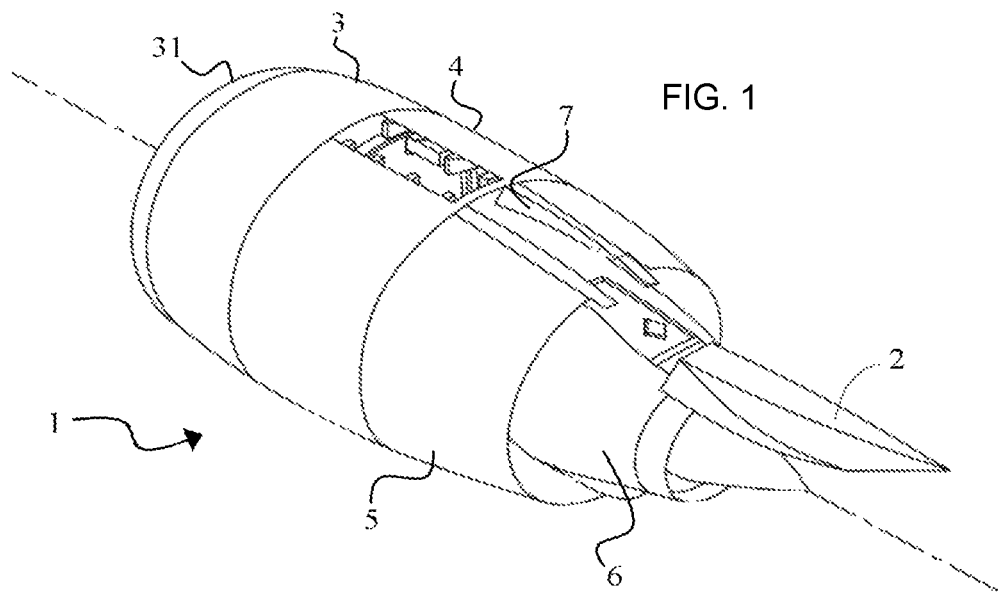
FIG. 1 represents a nacelle of an aircraft turbojet engine according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

An example of a nacelle 1 is illustrated in FIG. 1. The nacelle 1 hangs from a pylon 2 intended to be fastened to a wing (not represented) of an aircraft (not represented). The nacelle 1 comprises an upstream section 3 provided with a lip 31 forming an air inlet, a middle section 4 receiving a fan (not represented) of a turbojet engine (not represented), and a downstream section 5.

The downstream section 5 includes an inner fixed structure 6 surrounding an upstream portion of the turbojet engine (not represented) and an outer fixed structure 7. The inner fixed structure 6 and the outer fixed structure 7 delimit an annular flow path defining a passage for a cold air flow penetrating the nacelle 1 at the level of the air inlet.

Figure 2:
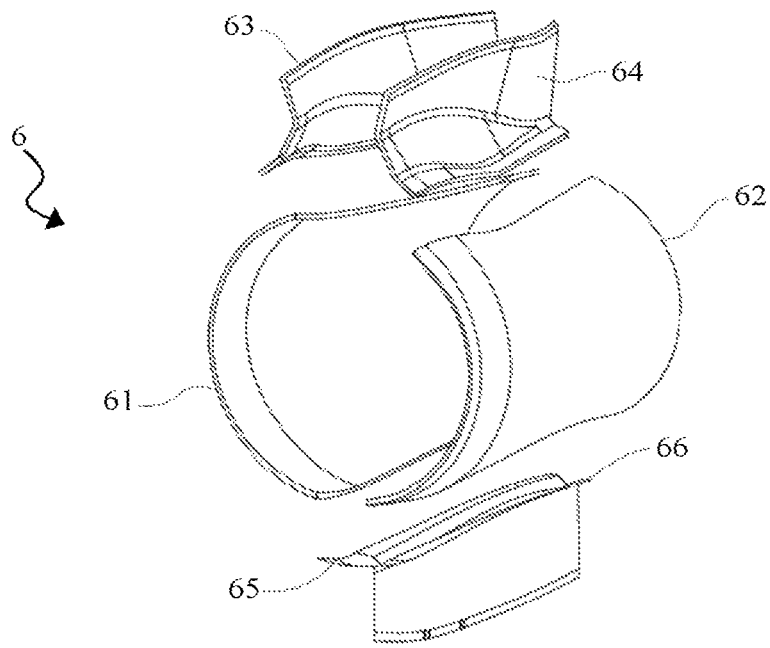
FIG. 2 is an exploded view of an inner fixed structure of a nacelle of an aircraft turbojet engine according to the present disclosure.

FIG. 2 is an exploded view of an inner fixed structure 6. In this form, the inner fixed structure 6 comprises two half-barrels 61 and 62 as well as four half-islets 63, 64, 65 and 66. The two half-islets 63 and 64 constitute an islet, called 12H islet. The two half-islets 65 and 66 constitute an islet, called 6H islet. The 12H and 6H islets are intended to provide a structural linkage of the inner fixed structure 6 with the outer fixed structure 7. In particular, when the inner fixed structure 6 of FIG. 2 is mounted in the nacelle 1 of FIG. 1, the 12H islet is arranged to be placed vertically above the barrel formed by the two half-barrels 61 and 62, that is to say at the level of the pylon 2. In turn, the 6H islet is arranged to be placed vertically below said barrel, that is to say opposite to the 12H islet.

In a non-limiting manner, the present disclosure allows assembling "omega" shaped integral structures so as to constitute an inner fixed structure 6. In this example, a first integral structure is formed by the half-barrel 61 and the half-islets 63 and 65, shown in an exploded view in FIG. 2. A second integral structure is formed by the half-barrel 62 and the half-islets 64 and 66, shown in an exploded view in FIG. 2. In this example, the first integral structure and the second integral structure constitute the inner fixed structure 6.

Typically, the integral structures, given herein as examples, as well as other structures of the nacelle 1 comprises acoustic panels.

Figure 8:
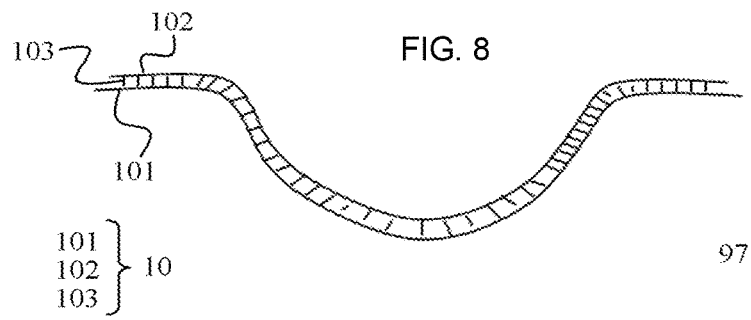
FIG. 8 represents an acoustic panel according to the present disclosure.

In one form, each integral structure of the inner fixed structure 6 includes an acoustic panel 10 provided with a honeycomb-type cellular structure 103 clasped between two skins 101 and 102 (FIG. 8).

The present disclosure proposes a device and a method for assembling by brazing or by diffusion-welding metallic parts for a nacelle 1. In particular, these metallic parts may include the skins 101 and 102 and the cellular structure 103 of an acoustic panel 10 forming an integral structure of the inner fixed structure 6. Once assembled, these metallic parts may also form any other structure for the nacelle 1, in particular structures having relatively large dimensions with respect to the dimensions of the nacelle 1 and/or having a relatively complex shape.

Figure 6:
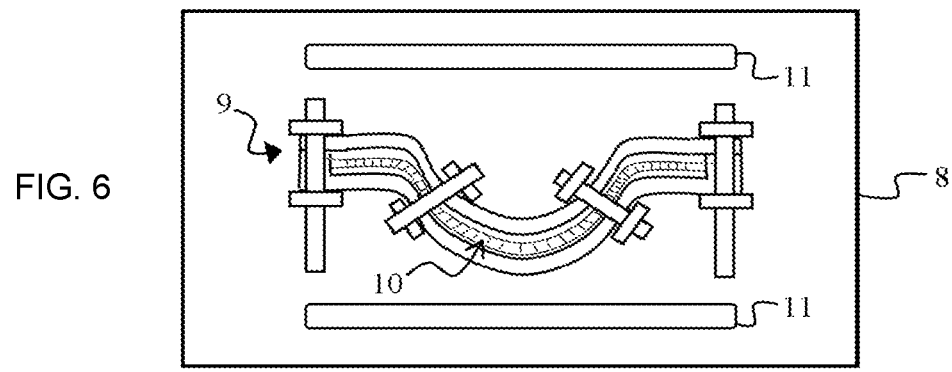
FIG. 6 represents a device according to the present disclosure.

Referring to FIG. 6, the device according to the present disclosure comprises an enclosure 8 arranged to receive a tooling 9 and the metallic parts 10.

Typically, the enclosure 8 is an enclosure of a furnace capable of withstanding temperatures for brazing or diffusion-welding the metallic parts 10.

The device comprises a heating device 11 arranged to increase the temperature inside the enclosure 8 up to an assembly temperature allowing assembling the metallic parts 10 by brazing or diffusion-welding. Typically, the assembly temperature is higher than 800° C. and is chosen according to the material of the metallic parts 10. Thus, the assembly temperature typically comprises:

between 830° C. and 980° C., for example 850° C., for parts to assemble made of titanium;

between 1000° C. and 1050° C., for example 1010° C., for parts to assemble made of stainless steel; and between 580° C. and 620° C., for example 600° C., for parts to assemble made of aluminum.

Figure 5:
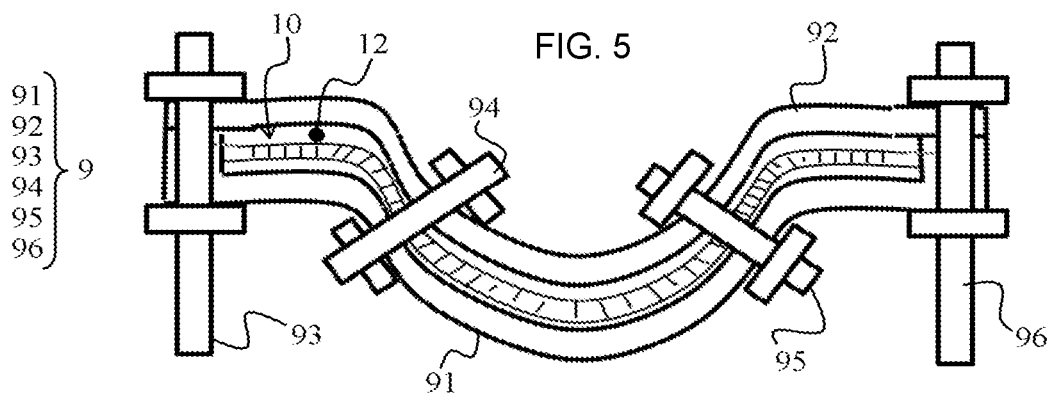

Referring to FIG. 5, the tooling 9 includes a first mold element 91 and a second mold element 92. The tooling 9, and in particular the first mold element 91 and the second mold element 92, is arranged to clasp the metallic parts 10 to assemble within an assembly space 12. The assembly space 12 is delimited by the first mold element 91 and the second mold element 92.

According to the present disclosure, the tooling 9 further comprises tie members 93, 94, 95 and 96 whose function is to provide the sealing of the assembly space 12. Only four tie members are represented in this example for illustration. The number of tie members should be adapted so as to provide a satisfactory sealing (see below). Furthermore, the tie members 93, 94, 95 and 96 are schematically represented in FIGS. 3 to 6, in particular in FIG. 5 where the tie members 94 and 95 are located, according to the present disclosure, at the periphery of the mold elements 91 and 92, in the same manner as the tie members 93 and 96. Thus, the tie member 93 is located at a periphery of the mold elements 91 and 92 on the left side of FIG. 5. The tie member 96 is located at a periphery of the mold elements 91 and 92 on the right side of FIG. 5. The tie members 94 and 95 are located at a periphery of the mold elements 91 and 92 in a plane parallel to the plane of this figure. For illustration, the tie members 94 are 95 are herein projected in the plane of FIG. 5.

Figure 7:
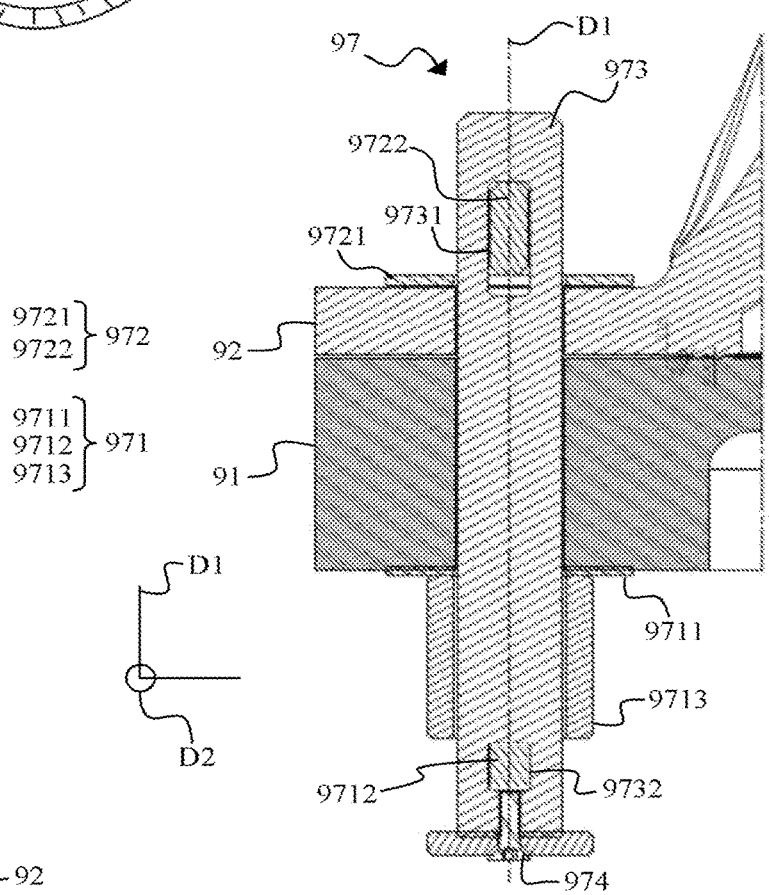
FIG. 7 is a partial sectional view of a tooling detail of tooling according to the present disclosure.

FIG. 7 shows a portion of a tooling 9 provided with a tie member 97 according to the present disclosure. The tie member 97 comprises two jaws 971 and 972 and a holding element 973.

In this example, the holding element 973 is received into respective orifices of the mold elements 91 and 92, that is to say that it is mounted throughout the mold elements 91 and 92.

The holding element 973 is arranged to hold the two jaws 971 and 972 in a sealing position illustrated in FIG. 7. In the sealing position, the jaws 971 and 972 exert a mechanical pressure against respective bearing surfaces of the first mold element 91 and of the second mold element 92. This mechanical pressure inhibits the first mold element 91 and the second mold element 92 form getting away from each other at least along a direction D1 normal to said bearing surfaces, at least at the assembly temperature.

In one form, the jaw 971 comprises a contact element 9711 and a stop element 9712, and the jaw 972 comprises a contact element 9721 and a stop element 9722. In the example of FIG. 7, each of the contact element 9711 and the contact element 9721 includes a washer.

As shown in FIG. 7, the contact element 9711 is arranged to come into contact with a bearing surface of the first mold element 91, whereas the contact element 9721 is arranged to come into contact with a bearing surface of the first mold element 92. The position thereby adopted by these different elements is called contact position.

Furthermore, the stop elements 9712 and 9722 are arranged to be received by the holding element 973 and to hold the contact elements 9711 and 9721 in the contact position. This reception is herein provided by apertures 9731 and 9732 formed in the holding element 973. The stop elements 9712 and 9722 and the holding element 973 are linked according to a slider joint allowing inserting the stop elements 9712 and 9722 into the apertures 9731 and 9732 along the direction D2.

In the example of FIG. 7, the jaw 971 comprises an adjustment part 9713 between the contact element 9711 and the stop element 9712. Alternatively or complementarily, in a form which is not represented, the jaw 972 may comprise such an adjustment part. The dimension of the adjustment element 9713 along the direction D1 and/or the material of this adjustment element may be chosen according to the assembly temperature.

In this example, the tie member 97 comprises a screw 974 configured to inhibit the stop element 9712 from slipping along the direction D2.

Each tie member 93, 94, 95 and/or 96 of the tooling 9 shown in FIG. 5 may be a tie member 97 of the type described hereinabove with reference to FIG. 7.

In order to provide a satisfactory sealing of the assembly space 12, the tooling 9 comprises tie members disposed along a circumference of the first mold element 91 and of the second mold element 92 so that the respective mechanical pressure exerted by the jaws of the tie members is substantially uniform along said circumference.

For example, tie members may be disposed according to a 300 mm step. In other words, two contiguous tie members may be spaced apart by 300 mm from each other. In one variation, this step should be adjusted according to the respective materials of the tooling 9, the pressure within the assembly space 12 and the assembly temperature.

According to the present disclosure, the first mold element 91 and the second mold element 92 comprise a third material, for example steel. The holding element of the tie members 93, 94, 95 and 96 comprises a second material, for example molybdenum. The jaws 971 and 972 of the tie members 93, 94, 95 and 96 comprise a first material, for example stainless steel. In any case, the first material has a thermal expansion coefficient higher than that of the second material, for example a thermal expansion coefficient twice to four times higher than that of the second material.

Furthermore, the material of the mold elements 91 and 92, that is to say said third material has a thermal expansion coefficient higher than that of the second material.

The increase of the thermal expansion coefficient of the first material and/or the third material, with respect to that of the second material, allows amplifying the clamping at the assembly temperature, that is to say increasing the respective mechanical pressure exerted by the jaws 971 and 972 on the mold elements 91 and 92, thanks to the respective thermal expansion of these different materials. This provides the sealing of the assembly space 12.

Figure 9:
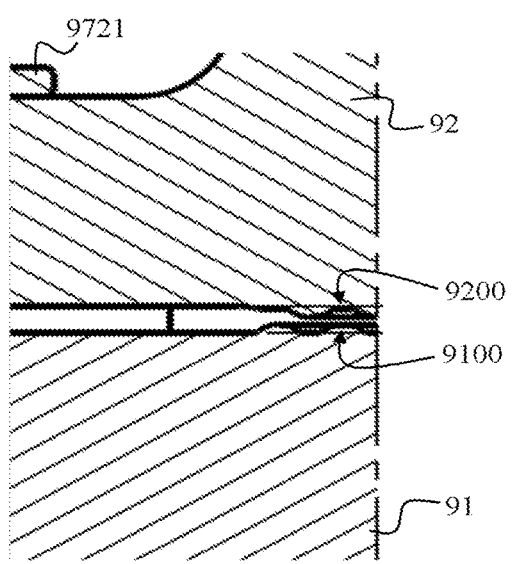
FIG. 9 is a partial sectional view of a portion of the tooling of a device according to the present disclosure.

Referring to FIG. 9, in one form, the first mold element 91 comprises a protrusion 9100 on a circumference of this first mold element 91. The protrusion 9100 extends along the direction D1 normal to the bearing surfaces of the first mold element 91 and of the second mold element 92. The second mold element 92 comprises a cavity 9200 on a circumference of this mold element 92. The first mold element 91 and the second mold element 92 are arranged so that in the sealing position, said cavity 9200 houses said protrusion 9100.

As illustrated in FIG. 9, the first mold element 91 may also comprise a cavity on a circumference of this first mold element 91 and the second mold element 92 may comprise a protrusion on a circumference of this second mold element 92 so that, in the sealing position, this cavity houses this protrusion.

More generally, the first mold element 91 may comprise one or several cavity(ies) and/or one or several protrusion(s) which cooperate respectively with one or several protrusion(s) and/or one or several cavity(ies) of the second mold element 92.

In the sectional plane of FIG. 9, the protrusion(s) 9100 may have a rounded shape defined for example by a radius comprised between 3 and 4 mm.

An assembly method according to the present disclosure is typically as follows.

Figure 3:
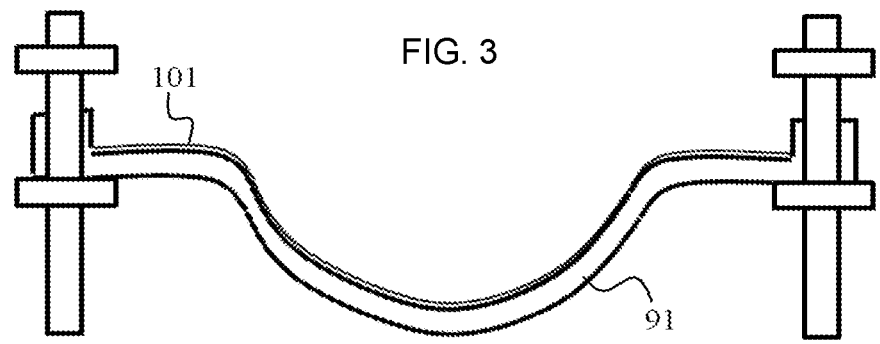
FIGS. 3 to 5 show a tooling of a device at successive assembly steps according to the present disclosure.
Figure 4:
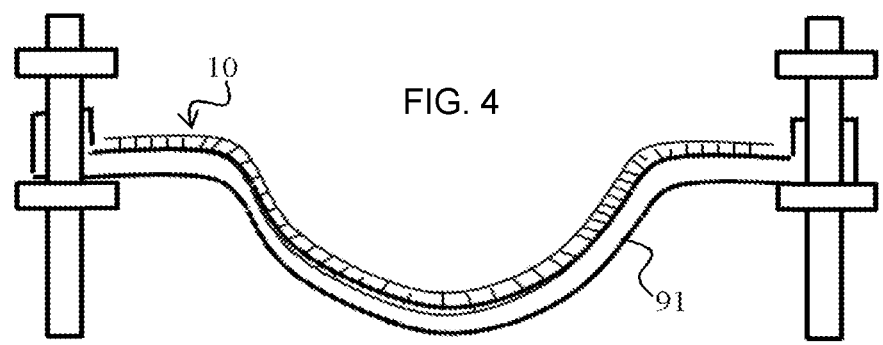

First, the metallic parts 10 to assemble are disposed against the first mold element 91. More specifically, referring to FIGS. 3 and 8, the acoustic outer skin 101 may be disposed on the first mold element 91 (FIG. 3). Afterwards, a cellular structure 103 may be disposed on the skin 101 as well as an inner skin 102 of the cellular structure 103 so as to thereby dispose the parts of an acoustic panel 10 to assemble against the first mold element 91 (FIGS. 4 and 8). In the case of an assembly by brazing, it is possible to further dispose brazing sheets (not represented) between each of the parts 10.

Afterwards, the second mold element 92 is disposed against the first mold element 91 so as to clasp the metallic parts 10 within the assembly space 12.

Afterwards, the tie members 93, 94, 95 and 96 are disposed so as to place the respective jaws of the tie members in the sealing position (FIG. 5).

The tooling 9 and the metallic parts 10 are placed into the enclosure 8 (FIG. 6). These may be placed after completion of the above-described steps or all or part of these steps may be carried out directly inside the enclosure 8.

Afterwards, a vacuum is created inside the enclosure 8 using a pumping device (not represented).

Afterwards, the temperature inside the enclosure 8 is increased using a heating device 11 up to the assembly temperature so as to assemble the metallic parts 10 by brazing or diffusion-welding.

When the assembly temperature is reached, a gas is injected into the assembly space 12 using a gas injection device (not represented) so as to press the metallic parts 10 against each other. In this example, the inner skin 102 may thus be pressed against the cellular structure 103. The gas injection may be carried out before the enclosure 8 reaching the assembly temperature. Nonetheless, it is desirable to start the gas injection when the assembly temperature is reached in order to benefit from the sealing achieved by the device.

Of course, the present disclosure is not limited to the examples that have been described and numerous arrangements may be brought to these examples without departing from the scope of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A device for assembling by brazing or diffusion-welding metallic parts for a nacelle of an aircraft turbojet engine, the device comprising:
   tooling including a first mold element and a second mold element, the tooling configured to clasp the metallic parts within an assembly space between the first mold element and the second mold element;
   a gas injection device to inject a gas into the assembly space such that an increase in pressure presses the metallic parts against each other;
   an enclosure adapted to receive the tooling and the metallic parts; and
   a heating device arranged to increase a temperature inside the enclosure to an assembly temperature,
   wherein the tooling further includes tie members configured to seal the assembly space, each tie member comprising two jaws and a holding element,
   wherein the holding element is configured to hold the two jaws in a sealing position and cause the two jaws to exert a mechanical pressure against respective bearing surfaces of the first mold element and of the second mold element such that the mechanical pressure inhibits the first mold element and the second mold element from getting away from each other at least along a direction normal to said bearing surfaces at least at the assembly temperature, wherein the two jaws of each tie member comprises a first material and the holding element of each tie member comprises a second material, the first material having a thermal expansion coefficient higher than a thermal expansion coefficient of the second material.

2. The device according to claim 1, wherein the tie members are disposed along a circumference of the first mold element and the second mold element such that the mechanical pressure exerted by the two jaws of each tie member is uniform along said circumference.

3. The device according to claim 1, wherein the first mold element and the second mold element each comprise a third material, the third material having a thermal expansion coefficient higher than that of the second material.

4. The device according to claim 1, wherein each jaw of the two jaws of each tie member comprises:

a contact element configured to come into contact with a bearing surface of the first mold element or the second mold element when in a contact position; and a stop element that is received by the holding element and operable to hold the contact element in the contact position.

5. The device according to claim 4, wherein at least one jaw of the two jaws of each tie member comprises an adjustment part between the contact element and the stop element.

6. The device according to claim 1 further comprising a pumping device to create vacuum inside the enclosure.

7. The device according to claim 1, wherein:

a circumference of the first mold element comprises at least one protrusion extending along the direction normal to the bearing surfaces of the first and second mold elements; and a circumference of the second mold element comprises at least one cavity, wherein each cavity is configured to house the at least one protrusion when in the sealing position.

8. The device according to claim 1, wherein:

a circumference of the second mold element comprises at least one protrusion extending along the direction normal to the bearing surfaces of the first and second mold elements; and a circumference of the first mold element comprises at least one cavity, wherein each cavity is configured to house the at least one protrusion when in the sealing position.

9. A method for assembling by brazing or diffusion-welding metallic parts for a nacelle of an aircraft turbojet engine, the method comprising:

arranging the metallic parts against the first mold element;

arranging the second mold element against the first mold element such that the metallic parts are clasped within the assembly space;

arranging the tie members along the first and second mold elements such that the respective jaws of each tie member is in the sealing position;

increasing the temperature inside the enclosure using the heating device;

injecting gas into the assembly space using the gas injection device to press the metallic parts against each other; and wherein the method is performed using a device according to claim 1.

* * * * *